United States Patent
Haimer et al.

(10) Patent No.: US 9,616,541 B2
(45) Date of Patent: Apr. 11, 2017

(54) SHRINK-FIT CHUCK WITH TOOL COOLING

(71) Applicant: HAIMER GMBH, Igenhausen (DE)

(72) Inventors: Franz Haimer, Igenhausen (DE); Josef Haimer, Igenhausen (DE)

(73) Assignee: HAIMER GMBH, Igenhausen (DE)

( * ) Notice: Subject to any disclaimer, the term of this patent is extended or adjusted under 35 U.S.C. 154(b) by 103 days.

(21) Appl. No.: 14/380,957

(22) PCT Filed: Feb. 6, 2013

(86) PCT No.: PCT/EP2013/052266
§ 371 (c)(1),
(2) Date: Aug. 26, 2014

(87) PCT Pub. No.: WO2013/127606
PCT Pub. Date: Sep. 6, 2013

(65) Prior Publication Data
US 2015/0042050 A1 Feb. 12, 2015

(30) Foreign Application Priority Data
Feb. 29, 2012 (DE) .................. 10 2012 101 672

(51) Int. Cl.
*B23Q 11/10* (2006.01)
*B23B 31/117* (2006.01)

(52) U.S. Cl.
CPC ...... *B23Q 11/1023* (2013.01); *B23B 31/1179* (2013.01); *B23B 2231/24* (2013.01);
(Continued)

(58) Field of Classification Search
CPC ............ B23B 31/1179; B23B 2240/28; B23B 2231/24; B23P 11/027; B23Q 11/1023;
(Continued)

(56) References Cited

U.S. PATENT DOCUMENTS

| 4,213,354 A * | 7/1980 | Dahinden ............ B23Q 11/005 407/11 |
| 4,795,292 A | 1/1989 | Dye |

(Continued)

FOREIGN PATENT DOCUMENTS

| DE | 10244759 | 9/2002 | |
| DE | 102004044267 A1 * | 3/2006 | ............ B23B 31/20 |

(Continued)

OTHER PUBLICATIONS

Third Party Observation for PCT/EP2013/052266, Jun. 30, 2014.
International Search Report for PCT/EP2013/052266 dated May 7, 2013.

*Primary Examiner* — Eric A Gates
*Assistant Examiner* — Chwen-Wei Su
(74) *Attorney, Agent, or Firm* — Paul D. Bianco; Katharine Davis; Fleit Gibbons Gutman Bongini & Bianco PL

(57) ABSTRACT

A shrink-fit chuck having a receiving body, a receiving opening for a tool shank, arranged in the receiving body, an accumulation and collection chamber arranged in the front region of the receiving opening and at least one coolant supply channel leading to the accumulation and collection chamber. The accumulation and collection chamber is delimited to the front by a ring bar arranged at the front end of the receiving opening. The internal diameter of the ring bar is adjusted to the internal diameter of the receiving opening in such a manner that as small an annular gap as possible exists between the ring bar and the tool shank. A plurality of outlet openings are provided in the ring bar for discharging to the outside a coolant routed via the coolant supply channel into the accumulation and collection chamber.

16 Claims, 2 Drawing Sheets

(52) U.S. Cl.
CPC ....... *B23B 2240/28* (2013.01); *B23B 2250/12* (2013.01); *Y10T 279/17111* (2015.01); *Y10T 279/17957* (2015.01); *Y10T 279/17965* (2015.01); *Y10T 279/3493* (2015.01)

(58) Field of Classification Search
CPC ....... Y10T 279/17965; Y10T 279/3493; Y10T 279/17111; Y10T 279/17957; Y10T 408/44; Y10T 409/304032; Y10T 409/303976
See application file for complete search history.

(56) References Cited

U.S. PATENT DOCUMENTS

| | | | |
|---|---|---|---|
| 5,358,360 A | 10/1994 | Mai | |
| 5,975,817 A * | 11/1999 | Komine | ................ B23B 31/001 |
| | | | 279/20 |
| 7,134,812 B2 | 11/2006 | Beckington | |
| 7,785,046 B2 | 8/2010 | Beckington | |
| 2004/0052598 A1 | 3/2004 | Haimer | |
| 2007/0077132 A1 | 4/2007 | Beckington | |
| 2009/0179368 A1* | 7/2009 | Haimer | ................ B23B 31/005 |
| | | | 269/54.2 |
| 2010/0270757 A1 | 10/2010 | Beckington | |
| 2011/0156363 A1 | 6/2011 | Haimer | |
| 2013/0069322 A1* | 3/2013 | Nakai | ................ B23B 31/028 |
| | | | 279/20 |
| 2013/0175769 A1* | 7/2013 | Yang | ................ B23B 31/028 |
| | | | 279/105.1 |

FOREIGN PATENT DOCUMENTS

| | | |
|---|---|---|
| DE | 102010028561 | 5/2010 |
| EP | 2570213 A1 | 3/2013 |
| EP | 2666567 | 11/2013 |
| FR | 2695341 A1 | 3/1994 |
| WO | 02/051571 | 7/2002 |
| WO | 2010022875 A1 | 3/2010 |
| WO | 2010062850 A1 | 6/2010 |
| WO | 2011/138360 | 11/2011 |

* cited by examiner

SHRINK-FIT CHUCK WITH TOOL COOLING

FIELD OF THE INVENTION

The invention pertains to a shrink-fit chuck with tool cooling.

BACKGROUND OF THE INVENTION

WO 2010/022875 A1 discloses shrink-fit chucks, in which an accumulation and collection chamber for a cooling fluid supplied through coolant supply channels is arranged in the front part of the shrink-fit chuck within the receiving opening. The accumulation and collection chamber is separated from the free end face of the shrink-fit chuck by a ring bar, wherein an annular gap exists between the ring bar and a chucked tool. These shrink-fit chucks are designed in such a way that the coolant supplied to the accumulation and collection chamber through the coolant supply channels is discharged forward to the tool through the annular gap only in order to form a closed coolant jacket around the tool. However, the coolant is in this case essentially routed along the tool shank, and the options for routing the jet to the tool are limited.

It is the objective of the invention to develop a shrink-fit chuck of the initially cited type that can be cost-effectively manufactured and still allows optimal cooling of the tools.

SUMMARY OF THE INVENTION

The invention discloses a shrink-fit chuck that can be cost-effectively manufactured and still allows optimal cooling of the tools.

Practical enhancements and advantageous embodiments of the invention are also disclosed.

In the inventive shrink-fit chuck, the internal diameter of the ring bar that delimits the accumulation and collection chamber toward the front is adapted to the internal diameter of the receiving opening in such a way that preferably no annular gap exists between the ring bar and the tool shank. During the shrink-fitting process, the ring bar participates in the deformation of the receiving body such that a tool can be respectively inserted or removed without any problems and as small a gap as possible exists between the ring bar and the tool shank after the shrink-fitting. In this way, a coolant can be easily and effectively conveyed to the outlet openings provided in the ring bar without coolant losses and purposefully routed from these outlet openings to the regions to be cooled. Ideally, no annular gap should exist between the ring bar and the tool shank such that the entire cooling fluid is discharged through the outlet openings. However, if a small gap does exist between the ring bar and the tool shank due to manufacturing-related tolerances, the cross section of the annular gap should amount to less than 20% of the overall cross section of the outlet openings.

In a potential implementation, e.g., the internal diameter of the ring bar may correspond to the internal diameter of the receiving opening.

In an advantageous embodiment, the ring bar is formed by a cover disk that is arranged on the front end of the receiving body and rigidly connected thereto. In this way, different shrink-fit chucks can be manufactured in a particularly rational and cost-effective fashion. Only cover disks of different designs are required in order to cost-effectively manufacture shrink-fit chucks that are individually adapted to the respective field of application in connection with standardized receiving bodies. Diverse shapes of outlet openings make it possible to adapt the cover disks to the different requirements such as, e.g., the length and the diameter of the tools. In addition, an inseparable connection between the receiving body and the cover disk ensures a permanent attachment with a correspondingly low failure probability of the connection. However, the ring bar and the receiving body may also be realized in one piece.

Exact positioning of the cover disk can be achieved in that it is inserted into the corresponding recess on the front side of the base body.

In a particularly advantageous embodiment, the cover disk is welded to the receiving body such that a durable and effectively sealed connection is produced.

The outlet openings may be formed by slots, oblong holes, bores and the like or by a combination thereof. This allows an optimal adaptation to the respective requirements of the coolant routing to the tool and/or workpiece.

The outlet openings may furthermore be realized in such a way that they allow the discharge of coolant at different angles referred to the shrink-fit chuck. This can be achieved, for example, in that the outlet openings in the form of bores have different angles referred to the center axis of the shrink-fit chuck. This makes it possible to purposefully route the jet to certain parts of the tool and/or the workpiece.

The coolant supply channel or supply channels may be realized in the form of bores within the receiving body or in the form of longitudinal grooves on the inner circumference of the receiving opening.

In a preferred implementation, some or all outlet openings are mutually offset relative to the coolant supply channels in the circumferential direction of the receiving body. In this way, an optimal accumulation effect within the accumulation and collection chamber and a more uniform distribution of the coolant over the outlet openings can be achieved.

BRIEF DESCRIPTION OF THE DRAWINGS

Other details and advantages of the invention result from the following description of preferred exemplary embodiments with reference to the drawings. In these drawings.

DETAILED DESCRIPTION OF THE INVENTION

Figure 1:
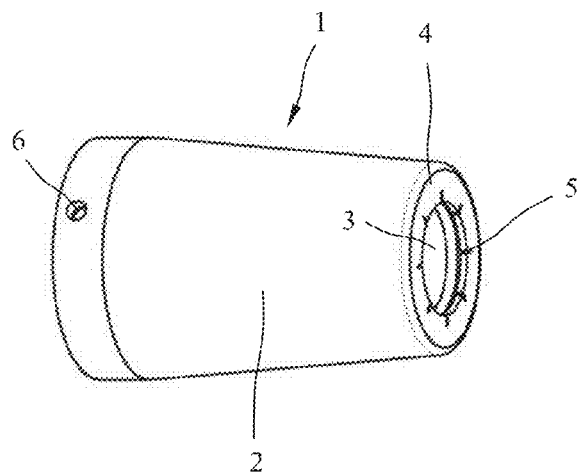
FIG. 1 shows a first exemplary embodiment of a shrink-fit chuck in the form of a perspective view.

FIG. 1 shows a shrink-fit chuck 1 with a receiving body 2 that contains a receiving opening 3 for a tool shank of a tool. A cover disk 4 with several slot-shaped outlet openings 5 is arranged on the front end of the receiving body 2 and inseparably connected to the receiving body 2. A plurality of radial bores 6 for the supply of a coolant are furthermore provided in the receiving body 2 and spaced apart from one another in the circumferential direction.

Figure 2:
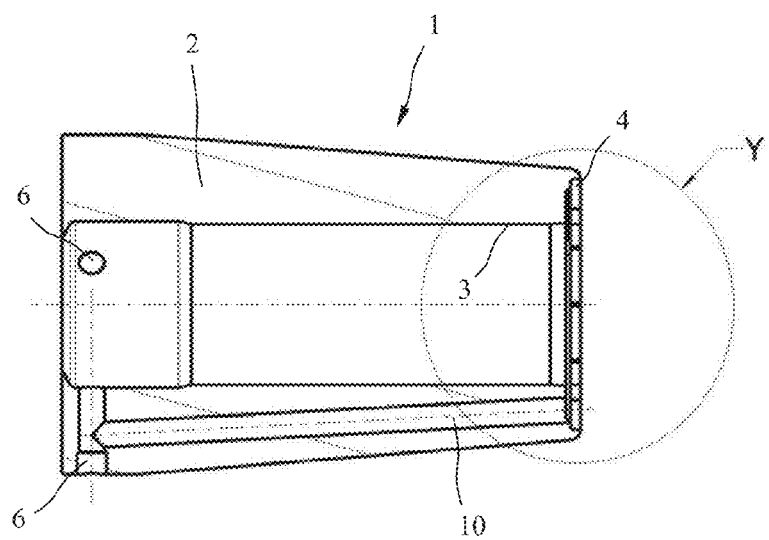
FIG. 2 shows the shrink-fit chuck according to FIG. 1 in the form of a longitudinal section.
Figure 4:
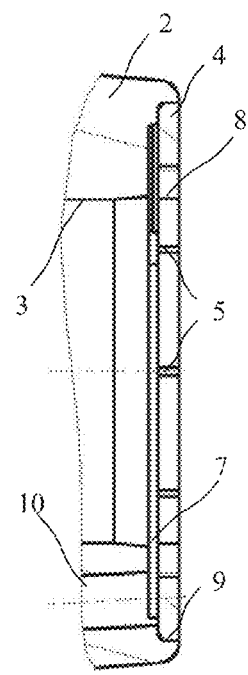
FIG. 4 shows an enlarged illustration of the detail Y in FIG. 2.

FIGS. 2 and 4, in particular, show that the receiving body 2 features an accumulation and collection chamber 7 in the form of an annular groove in the front region of the receiving opening 3. The cover disk 4 forms an inwardly protruding ring bar 8 that delimits the accumulation and collection chamber 7 toward the front and toward the tool shank. The internal diameter of the ring bar 8 corresponds to the internal diameter of the receiving opening 3 such that preferably no annular gap exists between the ring bar 8 and the tool shank after the shrink-fitting of the tool.

In the implementation shown, the cover disk 4 is inserted into a recess 9 on the front side of the receiving body 2 and inseparably connected to the receiving body 2, e.g., by means of welding. In this way, the cover disk 4 can correspondingly participate in the deformation of the receiving body 2 during the heating and cooling processes required for shrink-fitting the tool in the receiving body 2, and the ring bar 8 preferably can also rest against the tool shank after the shrink-fitting of the tool. The coolant supplied to the accumulation and collection chamber 7 should be discharged through the slot-shaped outlet openings 5 and not through an annular gap between the ring bar 8 and the tool shank.

FIG. 2 shows that coolant supply channels 10 in the form of longitudinally extending bores are arranged within the receiving body 2 and extend from the radial bores 6 to the accumulation and collection chamber 7. A coolant can be routed into the accumulation and collection chamber 7 through the bores 6 and the coolant supply channels 10 and then from the accumulation and collection chamber to a tool chucked in the receiving body 2 through the slot-shaped outlet openings 5.

Figure 3:
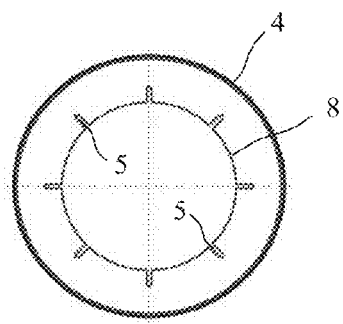
FIG. 3 shows a cover disk of the shrink-fit chuck according to FIG. 1 in the form of a front view.

According to FIG. 3, the outlet openings 5 extend in the ring bar 8 formed by the cover disk 4 in the form of longer and narrow slots, namely radially outward in a star-shaped fashion from the inner circumference of the ring bar. Due to the implementation of the outlet openings 5 in the form of long and narrow slots, a high spraying angle at the cutting region of the tool can be realized, and a high flow velocity can be achieved. This allows reliable and purposeful cooling.

Figure 5:
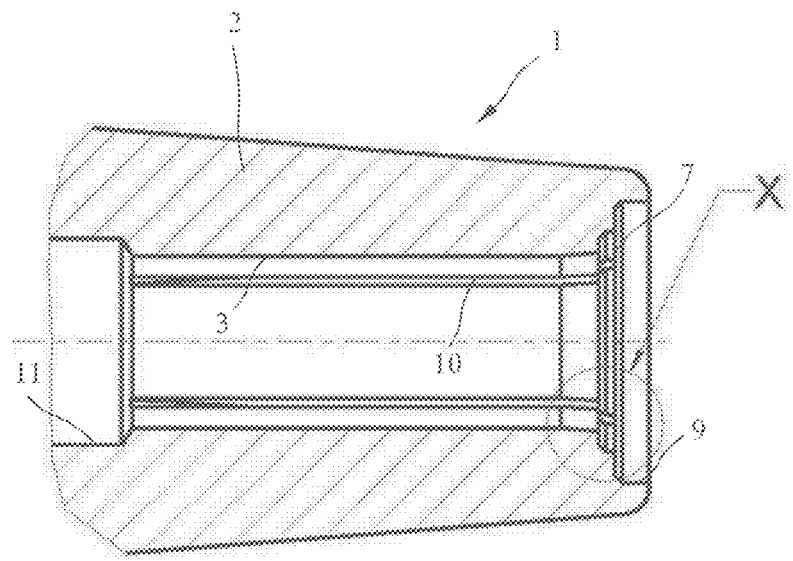
FIG. 5 shows a receiving body of a second exemplary embodiment of the shrink-fit chuck in the form of a longitudinal section.

FIG. 5 shows the receiving body 2 of another exemplary embodiment of an inventive shrink-fit chuck. In contrast to the preceding embodiment, the coolant supply channels 10 are realized in the form of longitudinal grooves on the inner circumference of the receiving opening 3. The coolant supply channels 10 in the form of longitudinal grooves extend from a widened rear region 11 of the receiving opening 3 to the accumulation and collection chamber 7. The coolant is also routed to the accumulation and collection chamber 7 through the coolant supply channels 10 in this case.

Figure 6:
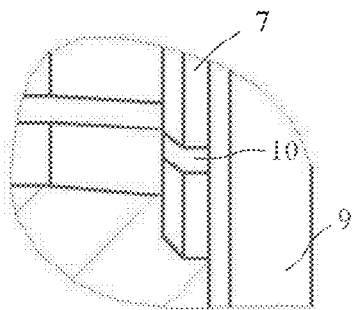
FIG. 6 shows an enlarged illustration of the detail X in FIG. 5.

According to FIG. 6, a recess 9 for receiving a cover disk 4 is also provided on the front side of the receiving body 2 in this case. The accumulation and collection chamber 7 may feature several steps with different diameters in order to achieve an optimal accumulation and collection effect and therefore a uniform distribution of the coolant flow over the outlet openings 5. In the implementation shown, some of the coolant supply channels 10 in the form of longitudinal grooves also continue into the accumulation and collection chamber 7 and thereby contribute to a favorable distribution of the coolant flow.

Figures 7, 8:
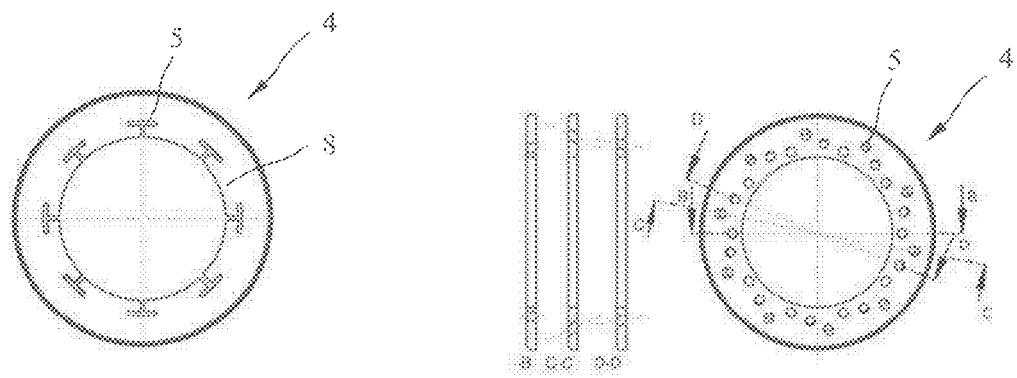
FIG. 7 shows a second exemplary embodiment of a cover disk in the form of a front view.
FIG. 8 shows a third exemplary embodiment of a cover disk in the form of a front view and in the form of sectional views.

FIGS. 7 and 8 show other embodiments of cover disks 4 with outlet openings 5 of different shapes. FIG. 7 shows T-shaped slots that extend radially outward from the inner circumference. FIG. 8 shows several bores that are arranged in circular patterns and have different angles referred to the center axis of the cover disk 4. This makes it possible to purposefully cool different regions of the tool. It is obvious that the shape, number, dimension and orientation of the outlet openings make it possible to individually adapt the coolant supply to the tool to a plurality of requirements.

The invention is not limited to the exemplary embodiments of the cover disks that were described above and are illustrated in the drawings. For example, the coolant supply to the tool can be optimized by varying the shape, number, dimension and orientation of the outlet openings, as well as their position on the disk.

The invention claimed is:

1. A shrink-fit chuck comprising:
   a receiving body;
   a receiving opening in the receiving body, the receiving opening for receiving a shank of a tool;
   an accumulation and collection chamber in a front region of the receiving opening;
   at least one coolant supply channel opening into the accumulation and collection chamber;
   a ring bar formed by a cover disk welded to a front end of the receiving body, the cover disk having an internal diameter adapted to an internal diameter of the receiving opening; the cover disk delimiting the accumulation and collection chamber toward the front region of the receiving opening; and
   a plurality of outlet openings in the cover disk, the plurality of outlet openings for discharging a coolant routed into the accumulation and collection chamber from the coolant supply channel;
   wherein, during shrink fitting, the cover disk is configured and arranged for deforming the receiving body such that the tool is inserted into or removed from the receiving opening and for narrowing an annular gap between the cover disk and the shank of the tool.

2. The shrink-fit chuck according to claim 1, wherein the internal diameter of the cover disk corresponds to the internal diameter of the receiving opening.

3. The shrink-fit chuck according to claim 1, wherein the cover disk is inserted into a recess on the front end of the receiving body.

4. The shrink-fit chuck according to claim 1, wherein the plurality of outlet openings are formed as bores.

5. The shrink-fit chuck according to claim 4, wherein the plurality of outlet openings are bores having different angles relative to a center axis of the shrink-fit chuck.

6. The shrink-fit chuck according to claim 1, wherein the plurality of outlet openings are formed by a plurality of rows of bores.

7. The shrink-fit chuck according to claim 1, further comprising a plurality of coolant supply channels formed as bores within the receiving body.

8. The shrink-fit chuck according to claim 1, further comprising a plurality of coolant supply channels formed as longitudinal grooves on an inner circumference of the receiving opening.

9. The shrink-fit chuck according to claim 1, further comprising a plurality of coolant supply channels offset relative to one another in a circumferential direction of the receiving body.

10. The shrink-fit chuck according to claim 1, wherein the annular gap between the cover disk and the shank of the tool is completely narrowed and closed after the tool is shrink fit into the chuck.

11. The shrink-fit chuck according to claim 1, wherein a cross section of the annular gap is less than 20% of a cross section of the outlet openings in the cover disk.

12. The shrink-fit chuck according to claim 1, wherein the plurality of outlet openings are formed as narrow slots.

13. The shrink-fit chuck according to claim 1, wherein the plurality of outlet openings are formed as oblong holes.

14. The shrink-fit chuck according to claim 1, wherein a portion of the outlet openings of the plurality of outlet openings are offset relative to one another in a circumferential direction of the receiving body.

15. The shrink-fit chuck according to claim 1, wherein all of the outlet openings of the plurality of outlet openings are offset relative to one another in a circumferential direction of the receiving body.

16. A shrink-fit chuck comprising:
a receiving body;
a receiving opening in the receiving body, the receiving opening for receiving a shank of a tool;
an accumulation and collection chamber in a front region of the receiving opening;
at least one coolant supply channel opening into the accumulation and collection chamber;
a ring bar formed by a cover disk welded to a front end of the receiving body, the cover disk having an internal diameter adapted to an internal diameter of the receiving opening; the cover disk delimiting the accumulation and collection chamber toward the front region of the receiving opening; and
a plurality of outlet openings in the cover disk, the plurality of outlet openings for discharging a coolant routed into the accumulation and collection chamber from the coolant supply channel;
wherein, during shrink fitting, the cover disk is configured and arranged for deforming the receiving body such that the tool is inserted into or removed from the receiving opening and for closing an annular gap between the cover disk and the shank of the tool such that there is no annular gap between the cover disk and the shank of the tool after the tool is shrink fit into the chuck.

* * * * *